US008798183B2

(12) United States Patent
Xu et al.

(10) Patent No.: US 8,798,183 B2
(45) Date of Patent: Aug. 5, 2014

(54) FEEDBACK AND RATE ADAPTATION FOR MIMO TRANSMISSION IN A TIME DIVISION DUPLEXED (TDD) COMMUNICATION SYSTEM

(75) Inventors: Hao Xu, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 12/181,732

(22) Filed: Jul. 29, 2008

(65) Prior Publication Data

US 2009/0046800 A1 Feb. 19, 2009

Related U.S. Application Data

(60) Provisional application No. 60/955,622, filed on Aug. 13, 2007.

(51) Int. Cl.
*H04B 7/02* (2006.01)

(52) U.S. Cl.
USPC ........... 375/267; 375/299; 375/260; 375/259; 375/295; 375/316; 375/347; 375/346; 375/219

(58) Field of Classification Search
CPC .. H04B 7/0636; H04B 7/0639; H04B 7/0632; H04B 7/0613; H04B 7/0619; H04B 7/02; H04B 7/0413; H04B 7/0417; H04B 7/0421; H04L 1/0026; H04L 5/0057; H04L 5/0023
USPC ......... 375/267, 299, 260, 259, 295, 316, 247, 375/246, 219
See application file for complete search history.

(56) References Cited

U.S. PATENT DOCUMENTS 5,852,630 A * 12/1998 Langberg et al. ............. 375/219
6,041,046 A    3/2000 Scott et al.
(Continued)

FOREIGN PATENT DOCUMENTS

CA    2542655 A1    4/2005
CN    1411640 A     4/2003
(Continued)

OTHER PUBLICATIONS

Written Opinion—PCT/US2005/046743—European Patent Office, Munich—May 24, 2006.

(Continued)

*Primary Examiner* — Kenneth Lam
(74) *Attorney, Agent, or Firm* — Kenyon S. Jenckes

(57) ABSTRACT

Techniques for sending a MIMO transmission in a wireless communication system are described. In one design, a transmitter sends a first reference signal to a receiver. The receiver selects a precoding matrix based on the first reference signal and in accordance with a selection criterion. The receiver estimates noise and interference at the receiver and determines channel quality indicator (CQI) or modulation and coding scheme (MCS) information based on the precoding matrix and the estimated noise and interference. The receiver sends the CQI or MCS information and a second reference signal to the transmitter. The transmitter selects the precoding matrix based on the second reference signal and in accordance with the same selection criterion used by the receiver. The transmitter then sends a MIMO transmission to the receiver based on the CQI or MCS information obtained from the receiver and the precoding matrix selected by the transmitter.

19 Claims, 6 Drawing Sheets

(56) References Cited

U.S. PATENT DOCUMENTS

| | | | |
|---|---|---|---|
| 6,292,494 B1 | 9/2001 | Baker et al. | |
| 6,529,487 B1 | 3/2003 | Rose | |
| 6,920,171 B2 | 7/2005 | Souissi et al. | |
| 6,934,388 B1 | 8/2005 | Clark | |
| 6,981,157 B2 | 12/2005 | Jakobsson et al. | |
| 7,039,370 B2 | 5/2006 | Laroia et al. | |
| 7,486,735 B2 | 2/2009 | Dubuc et al. | |
| 7,697,622 B2 * | 4/2010 | Han et al. | 375/260 |
| 7,860,149 B2 | 12/2010 | Palanki et al. | |
| 8,098,710 B2 | 1/2012 | Palanki et al. | |
| 8,098,711 B2 | 1/2012 | Palanki et al. | |
| 2003/0087673 A1 | 5/2003 | Walton et al. | |
| 2004/0082356 A1 * | 4/2004 | Walton et al. | 455/522 |
| 2004/0161018 A1 | 8/2004 | Maric | |
| 2004/0190640 A1 | 9/2004 | Dubuc et al. | |
| 2005/0128953 A1 | 6/2005 | Wallace et al. | |
| 2005/0165949 A1 | 7/2005 | Teague | |
| 2005/0286663 A1 | 12/2005 | Poon | |
| 2006/0072649 A1 | 4/2006 | Chang et al. | |
| 2006/0133530 A1 * | 6/2006 | Kwak et al. | 375/267 |
| 2007/0071147 A1 | 3/2007 | Sampath et al. | |
| 2007/0098099 A1 * | 5/2007 | Gore et al. | 375/260 |
| 2007/0174038 A1 | 7/2007 | Wang et al. | |
| 2007/0191066 A1 * | 8/2007 | Khojastepour et al. | 455/562.1 |
| 2007/0217388 A1 * | 9/2007 | Shiizaki et al. | 370/349 |
| 2007/0286304 A1 * | 12/2007 | Kim et al. | 375/267 |
| 2008/0037675 A1 * | 2/2008 | Lin et al. | 375/262 |
| 2008/0186918 A1 * | 8/2008 | Tinnakornsrisuphap et al. | 370/331 |
| 2008/0187062 A1 | 8/2008 | Pan et al. | |
| 2008/0188190 A1 * | 8/2008 | Prasad et al. | 455/114.3 |
| 2008/0232325 A1 * | 9/2008 | Mehta et al. | 370/332 |
| 2011/0122971 A1 * | 5/2011 | Kim et al. | 375/316 |

FOREIGN PATENT DOCUMENTS

| | | |
|---|---|---|
| CN | 1973473 A | 5/2007 |
| EP | 1973284 A2 | 9/2008 |
| EP | 2034682 A2 | 3/2009 |
| JP | 10240500 A | 9/1998 |
| JP | 2000515339 A | 11/2000 |
| JP | 2004289446 A | 10/2004 |
| JP | 2005509316 A | 4/2005 |
| JP | 2005242739 A | 9/2005 |
| RU | 2294599 | 2/2007 |
| WO | 9607284 A1 | 3/1996 |
| WO | 00011817 | 3/2000 |
| WO | 00051304 | 8/2000 |
| WO | 0105091 A1 | 1/2001 |
| WO | 0193479 | 12/2001 |
| WO | 02082689 A2 | 10/2002 |
| WO | WO02093819 A1 | 11/2002 |
| WO | WO03001761 A1 | 1/2003 |
| WO | 04032443 | 4/2004 |
| WO | 2004077777 | 9/2004 |
| WO | WO2004102815 A2 | 11/2004 |
| WO | WO2006007148 A1 | 1/2006 |
| WO | WO2006138555 A2 | 12/2006 |
| WO | WO2007050861 A2 | 5/2007 |

OTHER PUBLICATIONS

International Preliminary Report on Patentability—PCT1US20051046743—The International Bureau of WIPO, Geneva, Switzerland—Jun. 26, 2007.

Jim Tomcik, QFDD and QTDD: Technology Overview, IEEE 80220 Working Group On Mobile Broadband Wireless Access, Oct. 28, 2005, PR 48-50, UR, http://www.ieee802.org/201 contribs/C802.20-05-68.ZIP.

International Search Report and Written Opinion—PCT/US2008/072932—European Patent Office, Munich—Mar. 24, 2009.

C. Gessner: "UMTS Long Term Evolution (LTE) Technology Introductions". Rohde Schwarz Application Note 1MA111,Mar. 14, 2007, p. 1-32.

Hasegawa T., et al., "On the Searching Method of Spreading Codes from Their Autocorrelation Function Using a Genetic Algorithm," Technical Report of the Institute of Electronics, Information and Communication Engineers, Jan. 26, 1993, vol. 92. No. 446, pp. 25-30, SST 92-71.

Taiwan Search Report—TW097130900—TIPO—Mar. 20, 2012.

* cited by examiner

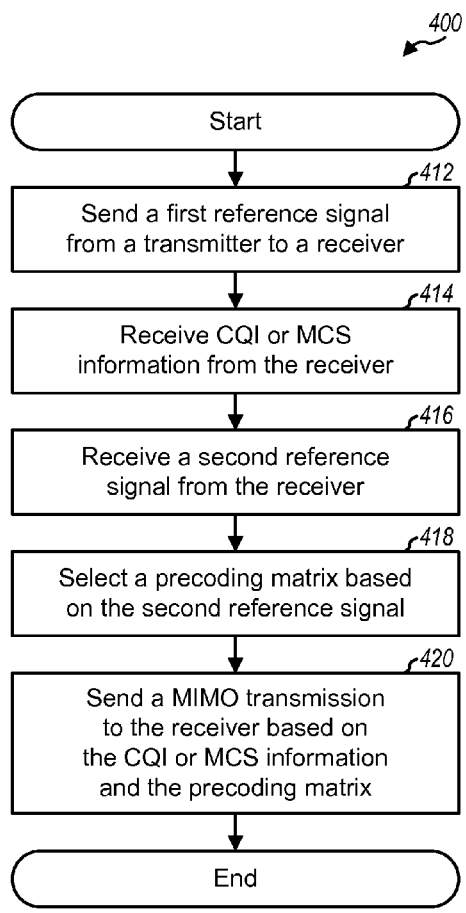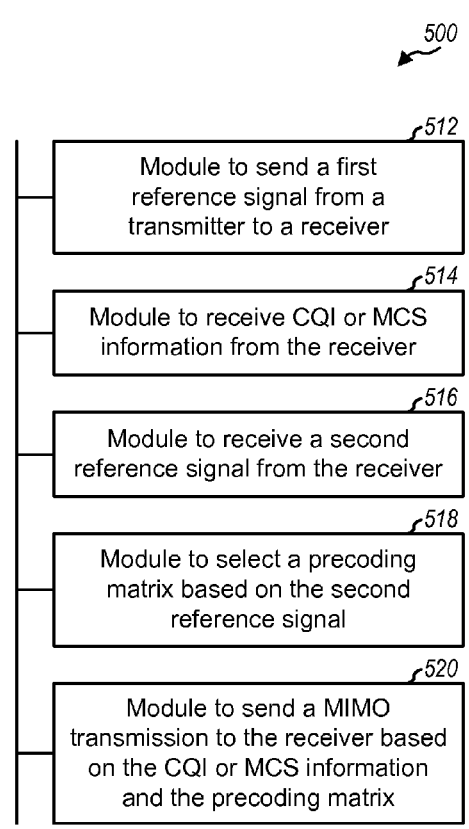
FIG. 4
FIG. 5

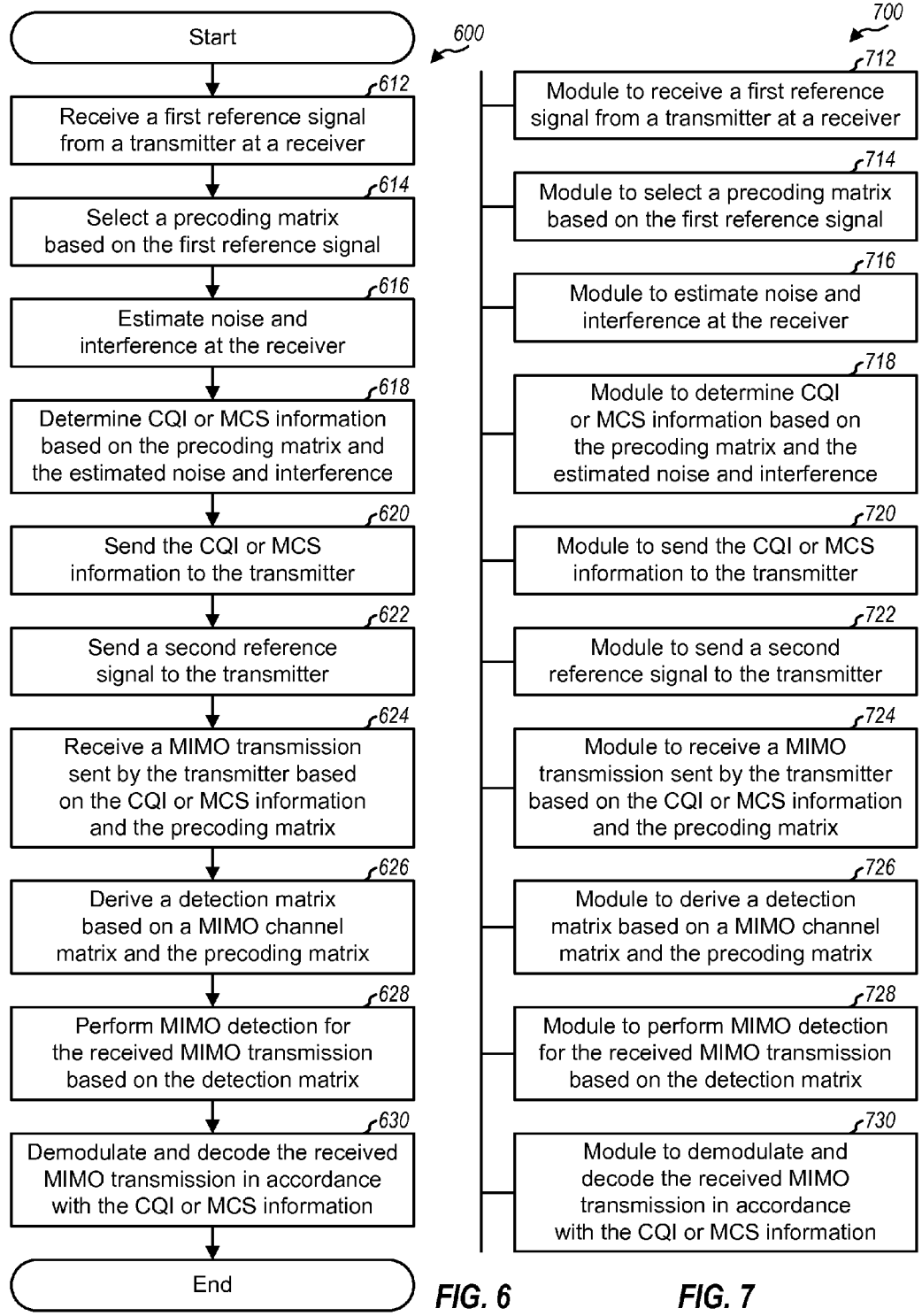

FEEDBACK AND RATE ADAPTATION FOR MIMO TRANSMISSION IN A TIME DIVISION DUPLEXED (TDD) COMMUNICATION SYSTEM

The present application claims priority to provisional U.S. Application Ser. No. 60/955,622, entitled "METHODS AND APPARATUSES FOR FEEDBACK MECHANISM AND RATE ADAPTATION FOR TIME DIVISION DUPLEX (TDD) MIMO SYSTEMS," filed Aug. 13, 2007, assigned to the assignee hereof and incorporated herein by reference.

BACKGROUND

I. Field

The present disclosure relates generally to communication, and more specifically to techniques for transmitting and receiving data in a wireless communication system.

II. Background

In a wireless communication system, a transmitter may utilize multiple (T) transmit antennas for data transmission to a receiver equipped with multiple (R) receive antennas. The multiple transmit and receive antennas form a multiple-input multiple-output (MIMO) channel that may be used to increase throughput and/or improve reliability. For example, the transmitter may transmit up to T symbol streams simultaneously from the T transmit antennas to improve throughput. Alternatively, the transmitter may transmit a single symbol stream from all T transmit antennas to improve reception by the receiver.

To achieve good performance, the receiver may estimate the MIMO channel response and determine a precoding matrix to use for a MIMO transmission. The receiver may also determine a channel quality indicator (CQI) or a modulation and coding scheme (MCS) for each symbol stream sent in the MIMO transmission. The receiver may send feedback information to the transmitter. This feedback information may include the precoding matrix as well as the CQI or MCS for each symbol stream. The feedback information is useful to the transmitter but represents overhead. It is desirable to reduce the amount of feedback information to send for the MIMO transmission.

SUMMARY

Techniques for sending a MIMO transmission with less feedback overhead in a wireless communication system are described herein. In an aspect, feedback overhead may be reduced by having both a transmitter and a receiver determine a precoding matrix to use for a MIMO transmission. This may be achieved by exploiting channel reciprocity due to time division duplexing in the system.

In one design, a transmitter may send a first reference signal or pilot to a receiver. The receiver may select a precoding matrix based on the first reference signal and in accordance with a selection criterion. In one design, the receiver may obtain a MIMO channel matrix based on the first reference signal and may obtain a beamforming matrix based on (e.g., by performing singular value decomposition of) the MIMO channel matrix. The receiver may then select the precoding matrix from a codebook of precoding matrices based on the beamforming matrix and in accordance with the selection criterion, e.g., the closest distance between the beamforming matrix and the precoding matrix. The receiver may estimate noise and interference at the receiver. The receiver may determine the number of symbol streams (S) to send and CQI or MCS information for the S symbol streams based on the precoding matrix, the estimated noise and interference, and possibly other information. The receiver may send the CQI or MCS information and a second reference signal or pilot to the transmitter.

The transmitter may select the precoding matrix based on the second reference signal and in accordance with the same selection criterion used by the receiver. The transmitter may then send a MIMO transmission to the receiver based on the CQI or MCS information obtained from the receiver and the precoding matrix selected by the transmitter. The transmitter may encode and modulate S symbol streams in accordance with the CQI or MCS information and may perform precoding for these symbol streams based on the precoding matrix.

The techniques described herein may be used for MIMO transmission on the downlink as well as the uplink. Various aspects and features of the disclosure are described in further detail below.

BRIEF DESCRIPTION OF THE DRAWINGS

FIG. 4 shows a process for sending a MIMO transmission.

FIG. 5 shows an apparatus for sending a MIMO transmission.

FIG. 6 shows a process for receiving a MIMO transmission.

FIG. 7 shows an apparatus for receiving a MIMO transmission.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for data transmission in LTE, and LTE terminology is used in much of the description below.

Figure 1:
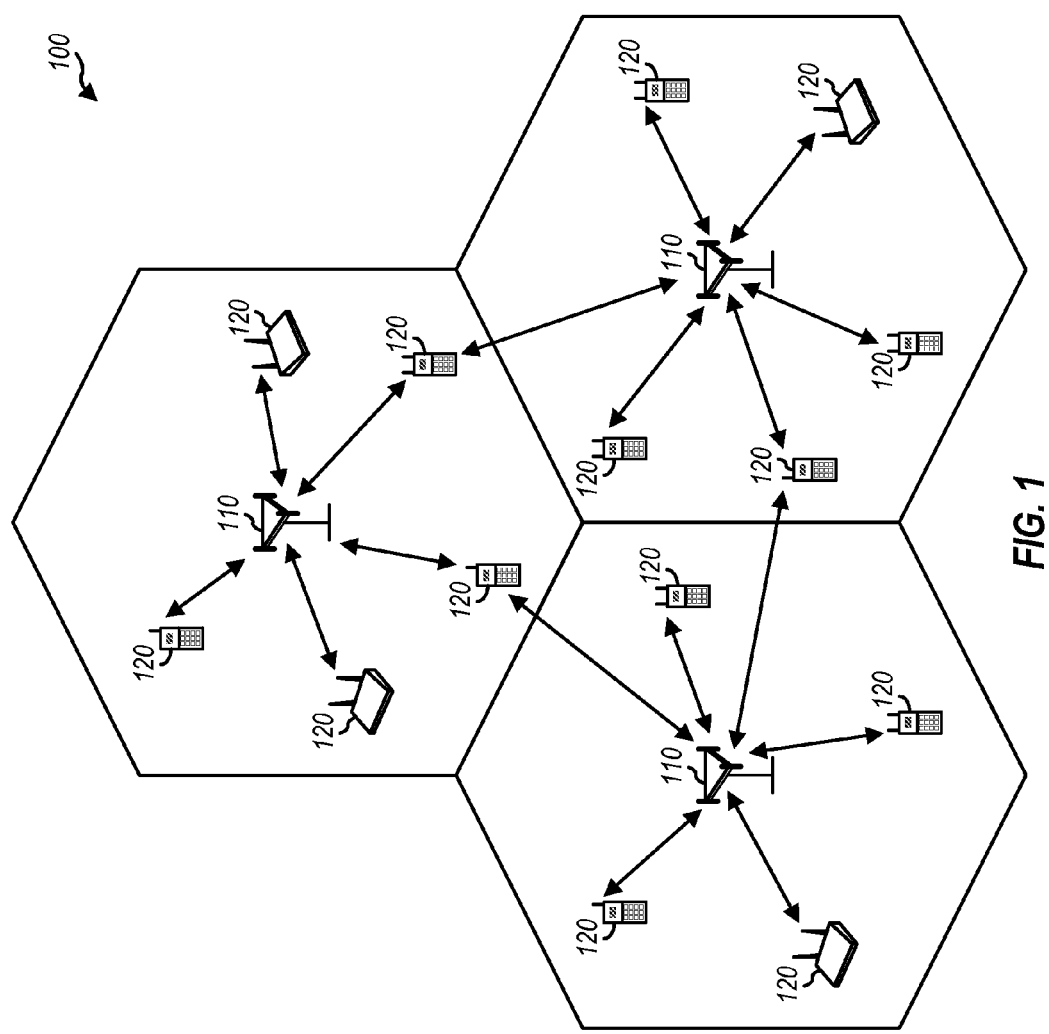
FIG. 1 shows a wireless communication system.

FIG. 1 shows a wireless communication system 100, which may be an LTE system. System 100 may include a number of Node Bs 110 and other network entities. A Node B may be a fixed station that communicates with the UEs and may also be referred to as an evolved Node B (eNB), a base station, an access point, etc. Each Node B 110 provides communication coverage for a particular geographic area. The overall coverage area of a Node B may be partitioned into multiple (e.g., three) smaller areas. Each smaller area may be served by a respective Node B subsystem. In 3GPP, the term "cell" can refer to the smallest coverage area of a Node B and/or a Node B subsystem serving this coverage area.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with a Node B via the downlink and uplink. The downlink (or forward link) refers to the communication link from the Node B to the UE, and the uplink (or reverse link) refers to the communication link from the UE to the Node B.

The system may utilize time division duplexing (TDD). For TDD, the downlink and uplink may share the same frequency channel, and a downlink channel response may be correlated with an uplink channel response.

Figure 2:
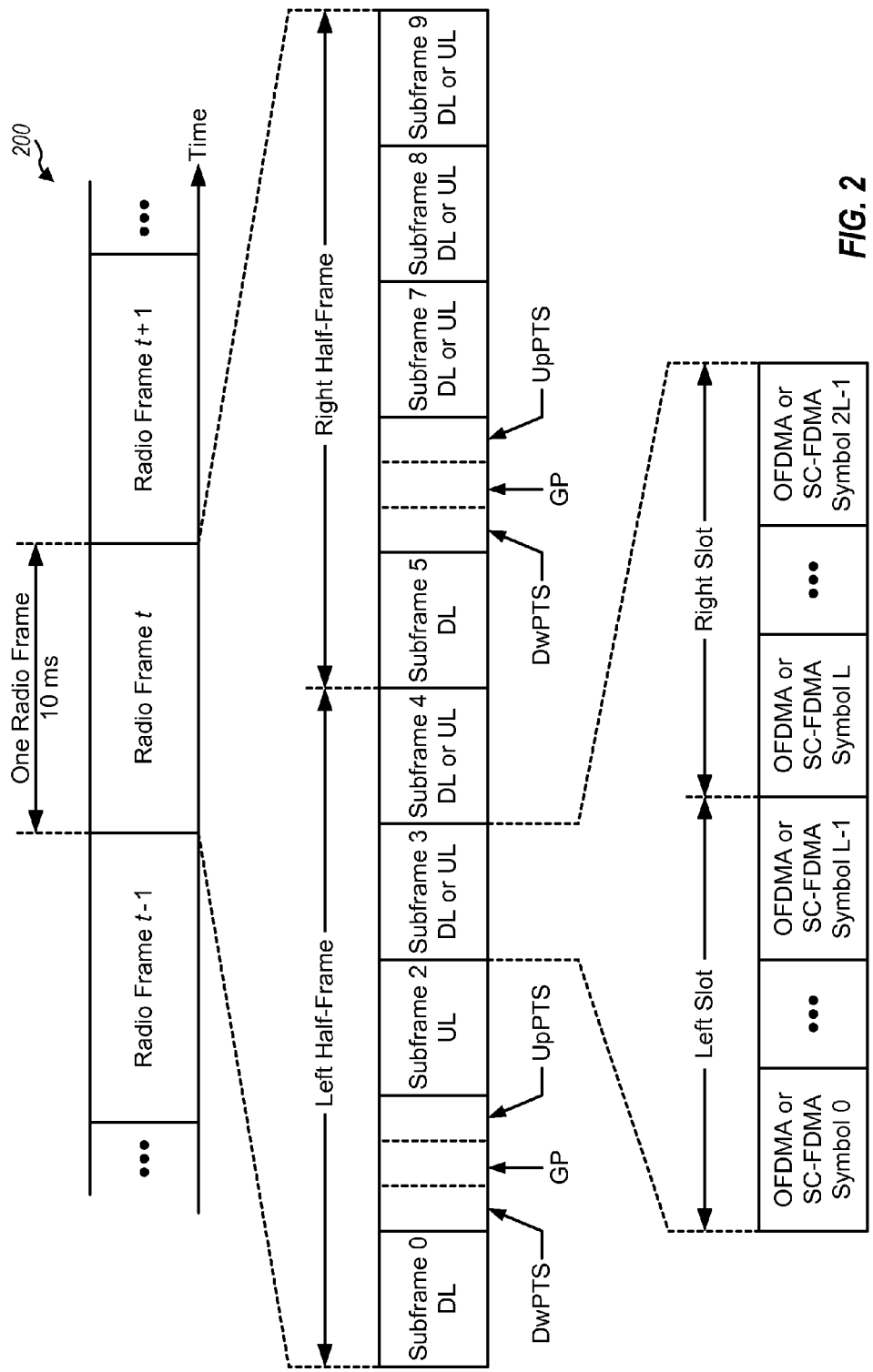
FIG. 2 shows an example frame structure.

FIG. 2 shows an example frame structure 200 that may be used for TDD in LTE. The transmission timeline may be partitioned into units of radio frames. Each radio frame may have a predetermined duration (e.g., 10 milliseconds (ms)) and may be partitioned into 10 subframes with indices of 0 through 9. LTE supports multiple downlink-uplink configurations. Subframes 0 and 5 may be used for the downlink (DL) and subframe 2 may be used for the uplink (UL) for all downlink-uplink configurations. Subframes 3, 4, 7, 8 and 9 may each be used for the downlink or uplink depending on the downlink-uplink configuration. Subframe 1 may include three special fields composed of a Downlink Pilot Time Slot (DwPTS) used for downlink control channels as well as data transmissions, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations.

Each subframe that is not used for the special fields may be partitioned into two slots. Each slot may include L symbol periods, e.g., L=6 symbol periods for an extended cyclic prefix or L=7 symbol periods for a normal cyclic prefix. Frame structure 200 is described in 3GPP TS 36.211, entitled "Evolved Universal Terrestrial Radio Access (E-UTRA); Physical Channels and Modulation," which is publicly available.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

The K total subcarriers may be grouped into resource blocks. Each resource block may include N subcarriers (e.g., N=12 subcarriers) in one slot. The available resource blocks may be assigned to the UEs for transmission of data and control information. The K total subcarriers may also be partitioned into subbands. Each subband may include 72 subcarriers in 6 resource blocks covering 1.08 MHz.

A Node B may periodically transmit a downlink reference signal, which may be a cell-specific reference signal for all UEs within a cell of the Node B or a UE-specific reference signal for a specific UE. A UE may be configured to periodically transmit a sounding reference signal to the Node B. A reference signal is a signal that is known a priori by both a transmitter and a receiver. A reference signal may also be referred to as pilot, preamble, sounding, training, etc. A Node B may transmit a downlink reference signal across all or part of the system bandwidth. A UE may use the downlink reference signal for channel estimation to estimate the downlink channel response and downlink channel quality for the Node B. The UE may transmit a sounding reference signal on a subband in a subframe. The UE may cycle through all subbands and transmit the sounding reference signal on different subbands in different subframes. The Node B may use the sounding reference signal for channel estimation to estimate the uplink channel response and uplink channel quality for the UE. The downlink reference signal and the sounding reference signal may be generated and transmitted as described in the aforementioned 3GPP TS 36.211. Other reference signals and pilots may also be transmitted on the downlink and uplink to support channel estimation.

A transmitter may send a MIMO transmission to a receiver. The receiver may estimate the MIMO channel response and determine a precoding matrix to use for the MIMO transmission. The receiver may also perform rank selection and determine the rank or number of symbol streams (S) to send for the MIMO transmission, where $1 \leq S \leq \min\{T, R\}$, T is the number of antennas at the transmitter, and R is the number of antennas at the receiver. The receiver may also perform rate selection and determine a CQI or an MCS for each symbol stream. CQI and MCS may provide equivalent information and may be used to select a coding scheme or code rate as well as a modulation scheme for a symbol stream to achieve a desired reliability, e.g., a target packet error rate (PER). The receiver may send feedback information comprising the precoding matrix and a CQI/MCS value for each symbol stream. The rank may be implicitly provided by the dimension of the precoding matrix or by the number of CQI/MCS values sent by the receiver. The transmitter may process (e.g., encode and modulate) each symbol stream in accordance with the CQI/MCS value for that symbol stream. The transmitter may further perform precoding for all S symbol streams based on the precoding matrix and may then send a MIMO transmission comprising the S precoded symbol streams to the receiver. Feedback overhead may be high to send both the precoding matrix and the CQI/MCS value for each symbol stream.

In an aspect, feedback overhead for a MIMO transmission in a TDD system may be reduced by having both the transmitter and receiver determine the precoding matrix to use for the MIMO transmission. This may be achieved by exploiting reciprocity of the MIMO channel in the TDD system, as described below. The receiver may determine the CQI/MCS value for each symbol stream based on the selected precoding matrix and the noise and interference estimated by the receiver. The receiver may send feedback information comprising only a CQI/MCS value for each symbol stream. Feedback overhead may be reduced by not sending the precoding matrix.

Figure 3:
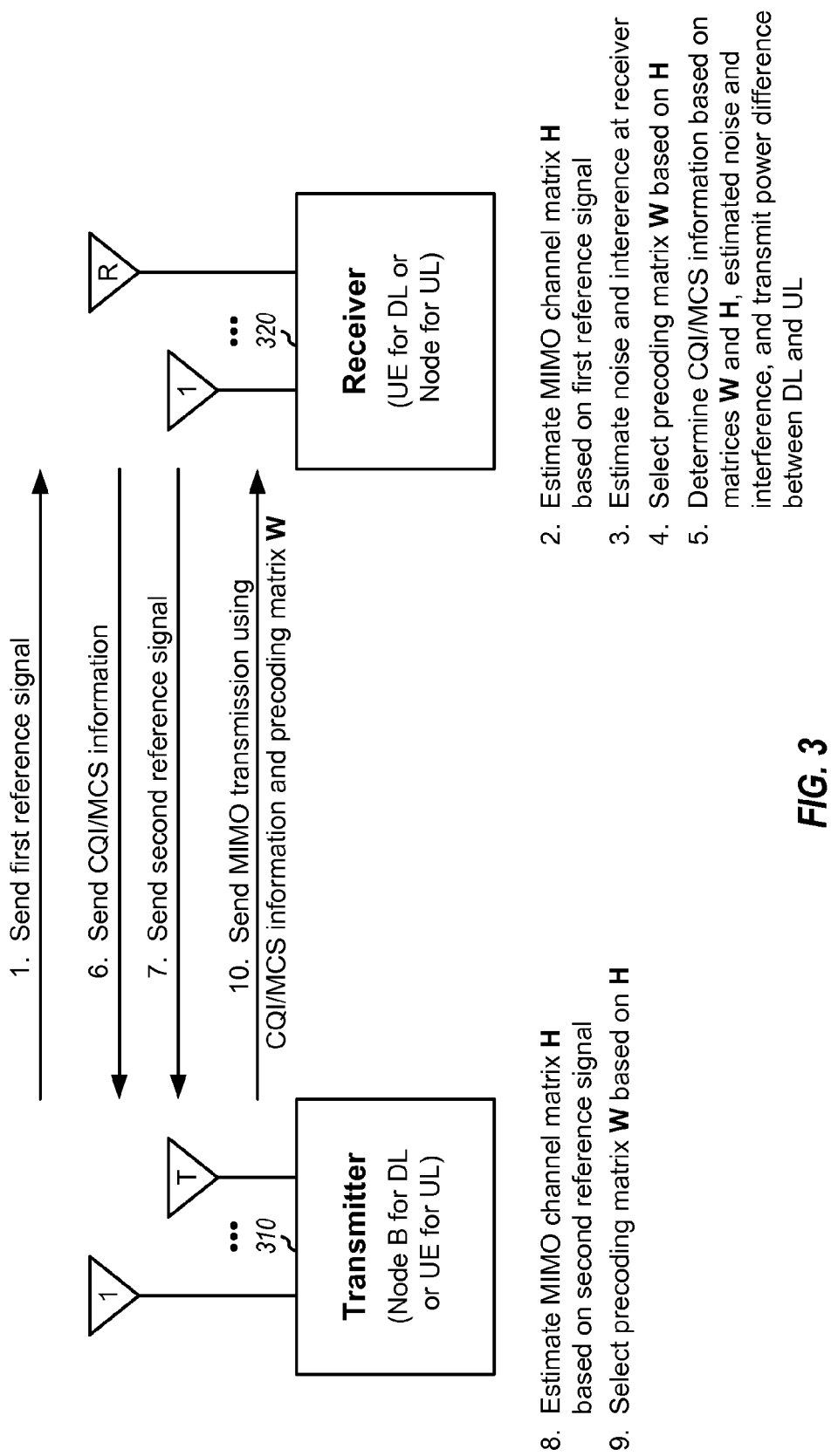
FIG. 3 shows a transmitter and a receiver for a MIMO transmission.

FIG. 3 shows a design of processing for a MIMO transmission from a transmitter 310 to a receiver 320 with reduced feedback overhead. For MIMO transmission on the downlink, transmitter 310 may be a Node B and receiver 320 may be a UE. For MIMO transmission on the uplink, transmitter 310 may be a UE and receiver 320 may be a Node B. The MIMO transmission may be sent on multiple subcarriers, and the processing at transmitter 310 and receiver 320 may be repeated for each subcarrier. For simplicity, much of the description below is for one subcarrier.

Transmitter 310 may send a first reference signal via all T antennas at the transmitter (step 1). The first reference signal may be a downlink reference signal if transmitter 310 is a Node B or a sounding reference signal if transmitter 310 is a UE. Receiver 320 may receive the first reference signal via all R antennas at the receiver. Receiver 320 may estimate the response of the MIMO channel from transmitter 310 to receiver 320 based on the first reference signal (step 2). Receiver 320 may obtain an R×T MIMO channel matrix H, which may be expressed as:

$$H = \begin{bmatrix} h_{1,1} & h_{1,2} & \ldots & h_{1,T} \\ h_{2,1} & h_{2,2} & \ldots & h_{2,T} \\ \vdots & \vdots & \ddots & \vdots \\ h_{R,1} & h_{R,2} & \ldots & h_{R,T} \end{bmatrix} \quad \text{Eq (1)}$$

where entry $h_{i,j}$, for $i=1, \ldots, R$ and $j=1, \ldots, T$, is a complex gain between antenna j at transmitter 310 and antenna i at receiver 320.

Transmitter 310 may transmit data on multiple subcarriers in one or more resource blocks. Receiver 320 may obtain a MIMO channel matrix for each subcarrier of interest, e.g., each subcarrier usable for data transmission. Receiver 320 may also estimate the noise and interference at the receiver (e.g., for each resource block usable for data transmission) based on the first reference signal and/or other received symbols (step 3).

Receiver 320 may select a precoding matrix W based on the MIMO channel matrix H and in accordance with a selection criterion (step 4). In one design, receiver 320 may diagonalize the MIMO channel matrix with singular value decomposition, as follows:

$$H = U\Sigma V^H, \quad \text{Eq (2)}$$

where
U is an R×R unitary matrix of left eigenvectors of H,
V is a T×T unitary matrix of right eigenvectors of H,
$\Sigma$ is an R×T diagonal matrix of singular values of H, and
"$H$" denotes a Hermitian or conjugate transpose.

A unitary matrix has columns that are orthogonal to one another, and each column has unit power. A diagonal matrix has possible non-zero values along the diagonal and zeros elsewhere. Matrix V may also be referred to as a beamforming matrix. Receiver 320 may also obtain the beamforming matrix V by performing eigenvalue decomposition of a covariance matrix of H. The eigenvalue decomposition may be expressed as $H^H H = V\Lambda V^H$, where $\Lambda = \Sigma^H \Sigma$ and $\Lambda$ is a diagonal matrix of eigenvalues of H.

Transmitter 310 may perform precoding with the beamforming matrix V in order to transmit data on the eigenmodes of H. The eigenmodes may be viewed as orthogonal spatial channels. The singular values in $\Sigma$ are indicative of the channel gains of the eigenmodes of H. The number of eigenmodes (M) may be given as $M \leq \min\{T, R\}$. Transmitter 310 may transmit up to M symbol streams on up to M eigenmodes using up to M columns of the beamforming matrix V. Good performance may be achieved by transmitting data on the eigenmodes of H.

A set of precoding matrices may be supported and may be referred to as a codebook. In one design, a precoding matrix in the codebook that is closest to the beamforming matrix V may be selected. A distance metric may be computed for each precoding matrix in the cookbook, as follows:

$$D_\ell = \sum_{i,j} |V_{i,j} - W_{\ell,i,j}|^2, \quad \text{Eq (3)}$$

where
$V_{i,j}$ is the (i, j)-th element of the beamforming matrix V, i.e., the element in the i-th row and j-th column of matrix V,
$W_{\ell,i,j}$ is the (i, j)-th element of the $\ell$-th precoding matrix in the cookbook, and
$D_\ell$ is a distance metric for the $\ell$-th precoding matrix.

The design in equation (3) assumes that receiver 320 obtained one MIMO channel matrix. If receiver 320 obtained multiple MIMO channel matrices for multiple subcarriers, then the distance metric may be given as:

$$D_\ell = \sum_{i,j,k} |V_{i,j}(k) - W_{\ell,i,j}|^2, \text{ where}$$

$V_{i,j}(k)$ the (i, j)-th element of the beamforming matrix for subcarrier k.

The distance metric in equation (3) may be indicative of the distance between the beamforming matrix V and a precoding matrix in the cookbook. The distance metric may be computed for each precoding matrix in the cookbook. The precoding matrix with the smallest distance metric among all precoding matrices in the cookbook may be selected. The selected precoding matrix W may be the closest approximation of the beamforming matrix V.

In the design described above, receiver 320 may select a precoding matrix based on the selection criterion of the selected precoding matrix being closest to the beamforming matrix among all precoding matrices in the codebook. In another design, receiver 320 may select a precoding matrix based on the MIMO channel matrix in accordance with a pseudo eigen-beamforming technique described in commonly assigned U.S. patent application Ser. No. 11/317,413, entitled "PSEUDO EIGEN-BEAMFORMING WITH DYNAMIC BEAM SELECTION," filed Dec. 22, 2005. Receiver 320 may also select a precoding matrix based on some other selection criterion.

Receiver 320 may select a precoding matrix based solely on the MIMO channel matrix H, as described above. Receiver 320 may also select a precoding matrix based on other information such as a noise covariance matrix.

Receiver 320 may determine the number of symbol streams to send and a CQI/MCS value for each symbol stream based on the selected precoding matrix W, the MIMO channel matrix H, the estimated noise and interference, and the available transmit power (step 5). Each symbol stream may be sent on one layer. Each layer may correspond to an eigenmode of H if the select precoding matrix W resembles the beamforming matrix V. Receiver 320 may hypothesize that transmitter 310 will transmit data using the selected precoding matrix W. The received symbols at receiver 320 may then be expressed as:

$$r = HWGd + n = H_{\text{eff}}d + n, \quad \text{Eq (4)}$$

where
d is a T×1 vector of data symbols,
G is a T×T diagonal matrix of gains for the data symbols,
$H_{\text{eff}} = H W G$ is an R×T effective MIMO channel observed by the data symbols,
r is an R×1 vector of received symbols, and
n is an R×1 vector of noise and interference.

The noise and interference may have a covariance matrix of $R_{nn} = E\{n\, n^H\}$, where $E\{\ \}$ denotes an expectation. The noise and interference may be assumed to be additive white Gaussian noise (AWGN) with a zero mean vector and a covariance matrix of $R_{nn} = \sigma_n^2 I$, where $\sigma_n^2$ is the variance of the noise and interference. Receiver 320 may estimate the noise and interference based on the first reference signal and/or other received symbols. Receiver 320 may average the noise and interference measurements over a suitable time period to obtain the noise variance or the noise covariance matrix.

Receiver 320 may perform MIMO detection based on minimum mean square error (MMSE), zero-forcing, MMSE with successive interference cancellation, or some other MIMO detection technique. For MMSE, receiver 320 may derive a T×R detection matrix M, as follows:

$$M = Q[H_{eff}^H H_{eff} + R_{nn}]^{-1} H_{eff}^H, \qquad \text{Eq (5)}$$

where $Z = [H_{eff}^H H_{eff} + R_{nn}]^{-1} H_{eff}^H H_{eff}$, and $Q = [\text{diag } Z]^{-1}$ is a diagonal matrix of scaling values to obtain normalized symbol estimates.

Receiver 320 may perform MIMO detection as follows:

$$\hat{d} = Mr, \qquad \text{Eq (6)}$$

where $\hat{d}$ is a T×1 vector of symbol estimates and is an estimate of data vector d sent by transmitter 310. If data is transmitted on multiple subcarriers, then receiver 320 may derive a detection matrix M(k) for each subcarrier k based on a MIMO channel matrix H(k) for that subcarrier and the selected precoding matrix W. Receiver 320 may then perform MIMO detection for each subcarrier k based on the detection matrix M(k) for that subcarrier.

Receiver 320 may determine a signal-to-and-noise-and-interference ratio (SINR) for each layer, as follows:

$$SINR_s = \frac{z_s}{1 - z_s}, \qquad \text{Eq (7)}$$

for $s = 1, \ldots, S,$ where $z_s$ is the s-th diagonal element of matrix Z and $SINR_s$ is the SINR of layer s.

The SINR of each layer may be dependent on the MIMO detection technique used by receiver 320. Different MIMO detection techniques may be associated with different equations for computing SINR. If data is transmitted on multiple subcarriers, then receiver 320 may determine the SINR of each layer s for each subcarrier k based on matrix Z(k) for that subcarrier.

Receiver 320 may perform rank selection to select one or more layers to use for data transmission. Receiver 320 may evaluate each possible combination of layers that can be used for data transmission. For a given layer combination or hypothesis, receiver 320 may allocate the available transmit power of $P_{avail}$ to the S layers in that combination based on uniform power allocation, so that $P_s = P_{avail}/S$ may be allocated to each layer. The power allocation may also be based on water-filling or some other technique. The available transmit power may be dependent on the difference between the transmit power for the downlink and the transmit power for the uplink. This power difference may be known or ascertainable by both transmitter 310 and receiver 320. The available transmit power may be given by a difference between the transmit power for data (which may be reflected in the gain matrix G) and the transmit power for the first reference signal (which may be reflected in the MIMO channel matrix H). In any case, receiver 320 may determine the gain matrix G based on the transmit power allocated to the S layers. The gain matrix G may include a non-zero gain for each selected layer and a zero gain for each unselected layer. Receiver 320 may then determine the effective MIMO channel matrix $H_{eff}$ based on the MIMO channel matrix H, the precoding matrix W, and the gain matrix G. Receiver 320 may determine the SINRs of the S layers based on the effective MIMO channel matrix $H_{eff}$ and the noise covariance matrix $R_{nn}$, as described above. Receiver 320 may compute a metric such as overall throughput based on the SINRs of the S layers for the current hypothesis.

Receiver 320 may repeat the computation described above for each possible combination of layers and may obtain an overall throughput for each combination. Receiver 320 may select the combination of layers with the highest overall throughput. Receiver 320 may convert the SINR of each layer in the selected combination to a CQI value based on a predetermined mapping. Alternatively, receiver 320 may select an MCS value for each layer based on the SINR of that layer using a predetermined mapping. Receiver 320 may obtain S CQI values or S MCS values for the S layers in the selected combination. These S CQI/MCS values may reflect both the selected precoding matrix W and the estimated noise and interference at receiver 320. Receiver 320 may send CQI/MCS information comprising the S CQI/MCS values for the S layers to transmitter 310 (step 6).

Receiver 320 may also send a second reference signal via all R antennas at the receiver (step 7). The second reference signal may be a sounding reference signal if receiver 320 is a UE or a downlink reference signal if receiver 320 is a Node B.

Transmitter 310 may receive the second reference signal via all T antennas at the transmitter. Transmitter 310 may estimate the response of the MIMO channel from receiver 320 to transmitter 310 based on the second reference signal (step 8). For a TDD system, the MIMO channel from receiver 320 to transmitter 310 may be assumed to be reciprocal of the MIMO channel from transmitter 310 to receiver 320. The MIMO channel matrix obtained by transmitter 310 may be given as $H^T$, where "$T$" denotes a transpose.

An overall MIMO channel from transmitter 310 to receiver 320 may be composed of the transmit chains for the T antennas at transmitter 310, the MIMO channel, and the receive chains for the R antennas at receiver 320. An overall MIMO channel from receiver 320 to transmitter 310 may be composed of the transmit chains for the R antennas at receiver 320, the MIMO channel, and the receive chains for the T antennas at transmitter 310. The responses of the transmit and receive chains at transmitter 310 may not match the responses of the transmit and receive chains at receiver 320. Calibration may be performed to determine a calibration matrix that may be applied (e.g., at transmitter 310) to account for the differences between the responses of the transmit and receive chains at transmitter 310 and receiver 320. Calibration may be performed as described in commonly assigned U.S. patent application Ser. No. 10/693,169, entitled "CHANNEL CALIBRATION FOR A TIME DIVISION DUPLEXED COMMUNICATION SYSTEM," filed Oct. 23, 2003. With the calibration matrix applied, the overall MIMO channel from transmitter 310 to receiver 320 may be assumed to be reciprocal of the overall MIMO channel from receiver 320 to transmitter 310. For simplicity, the following description assumes that the transmit and receive chains have flat responses and that the calibration matrix is an identity matrix. Transmitter 310 may use the transpose of the MIMO channel matrix $H^T$ obtained by transmitter 310 as an estimate of the MIMO channel matrix H obtained by receiver 320.

Transmitter 310 may select a precoding matrix W based on the MIMO channel matrix H obtained by transmitter 310 and in accordance with the same selection criterion used by receiver 320 (step 9). For the design described above, transmitter 310 may perform singular value decomposition of the MIMO channel matrix H to obtain the beamforming matrix V, as shown in equation (2). Transmitter 310 may then select the precoding matrix W based on the selection criterion of the selected precoding matrix W being closest to the beamforming matrix V among all precoding matrices in the codebook, as described above. Transmitter 310 and receiver 320 may be able to select the same precoding matrix W due to (i) the MIMO channel matrix obtained by transmitter 310 resembling the MIMO channel matrix obtained by receiver 320 due to channel reciprocity and (ii) the same selection criterion being used by both transmitter 310 and receiver 320.

The received symbols for MIMO transmissions on the downlink and uplink may be expressed as:

$$r_{DL} = H_{DL} x_{DL} + n_{DL}, \text{ and} \quad \text{Eq (8a)}$$

$$r_{UL} = H_{UL} x_{UL} + n_{UL}, \quad \text{Eq (8b)}$$

where $H_{DL}$ and $H_{UL}$ are MIMO channel matrices for the downlink and uplink, respectively, $x_{DL}$ and $x_{UL}$ are vectors of transmitted symbols for the downlink and uplink, $r_{DL}$ and $r_{UL}$ are vectors of received symbols for the downlink and uplink, and $n_{DL}$ and $n_{UL}$ are vectors of noise and interference for the downlink and uplink.

For a TDD system, the MIMO channel matrix obtained by transmitter 310 may be reciprocal of the MIMO channel matrix obtained by receiver 320. This reciprocity may result in $H_{DL}^T = H_{UL}$ in equation set (8). However, the noise and interference observed by receiver 320 may not match the noise and interference observed by transmitter 310. This may result in $n_{DL}$ being different from $n_{UL}$ in equation set (8). In one design, the difference in noise and interference may be accounted for by having receiver 320 determine the CQI/MCS value for each layer based on the noise and interference observed by receiver 320. Furthermore, receiver 320 may determine the CQI/MCS value for each layer based on the MIMO detection technique used by receiver 320, which may be unknown to transmitter 310. For this design, transmitter 310 may use the CQI/MCS value provided by receiver 320 for each layer. In another design, receiver 320 may send to transmitter 310 information indicative of the noise and interference observed by receiver 320. This information may comprise the noise variance $\sigma_n^2$, the noise covariance matrix $R_{nn}$, or some other information. Transmitter 310 may then determine the CQI/MCS value for each layer based on the information received from receiver 320. In yet another design, receiver 320 may send to transmitter 310 information indicative of the difference between the noise and interference observed by receiver 320 and the noise and interference observed by transmitter 310. This information may comprise CQI, MCS, noise variance, or some other information that can be used by transmitter 310 to compare against corresponding CQI, MCS, noise variance, etc., obtained by transmitter 310. Transmitter 310 may then determine the CQI/MCS value for each layer based on the noise and interference observed by transmitter 310 and the information received from receiver 320. For clarity, the following description assumes the design in which receiver 320 sends CQI/MCS information to transmitter 310.

Transmitter 310 may send S symbol streams on S layers and may process (e.g., encode and modulate) each symbol stream based on the CQI/MCS value for that symbol stream (step 10). In one design, transmitter 310 may process the S symbol streams based directly on the CQI/MCS values obtained from receiver 320. In another design, transmitter 310 may adjust the CQI/MCS values, e.g., to account for any difference between the transmit power assumed by receiver 320 in determining the CQI/MCS values and the transmit power actually used by transmitter 310. Transmitter 310 may then process the S symbol streams based on the adjusted CQI/MCS values.

Transmitter 310 may scale the S symbol streams based on the transmit power used for these symbol streams. Transmitter 310 may also perform precoding for the S symbol streams based on the precoding matrix W selected by transmitter 310 (also step 10). The symbol scaling and precoding may be expressed as:

$$x = WGd, \quad \text{Eq (9)}$$

where x is a T×1 vector of transmitted symbols. Transmitter 310 may then send a MIMO transmission comprising the S symbol streams to receiver 320 (also step 10).

The techniques described herein may be used for MIMO transmissions on the downlink as well as the uplink. In one design of MIMO transmission on the downlink, a Node B may transmit a downlink reference signal or a common pilot via T antennas at the Node B (step 1). A UE may estimate the downlink MIMO channel response based on the downlink reference signal or common pilot and may obtain a downlink MIMO channel matrix $H_{DL}$ (step 2). The UE may also estimate the noise and interference observed by the UE (step 3). The UE may select a precoding matrix W based on the downlink MIMO channel matrix and in accordance with a selection criterion, e.g., the closest distance to a beamforming matrix $V_{DL}$ obtained from the downlink MIMO channel matrix (step 4). The UE may determine S CQI values for S symbol streams based on the selected precoding matrix W and the estimated noise and interference and with consideration of the transmit power difference for the downlink and uplink (step 5). The UE may send the S CQI values to the Node B (step 6).

The UE may also send a sounding reference signal or pilot via the R antennas at the UE (step 7). The Node B may estimate the uplink MIMO channel response based on the sounding reference signal or pilot and may obtain an uplink MIMO channel matrix $H_{UL}$ (step 8). The Node B may obtain a downlink MIMO channel matrix $H_{DL}$ from the uplink MIMO channel matrix $H_{UL}$ by assuming channel reciprocity. The Node B may then select the precoding matrix W based on the downlink MIMO channel matrix and in accordance with same selection criterion used by the UE (step 9). The Node B may determine S MCS values for S symbol streams based on the S CQI values received from the UE. The Node B may then process the S symbol streams based on the S MCS values and may perform precoding for the S symbol streams based on the selected precoding matrix W (step 10). The Node B may then send a MIMO transmission comprising the S symbol streams to the UE.

In one design of MIMO transmission on the uplink, a UE may transmit a sounding reference signal or pilot via R antennas at the UE (step 1). A Node B may estimate the uplink MIMO channel response based on the sounding reference signal or pilot and may obtain an uplink MIMO channel matrix $H_{UL}$ (step 2). The Node B may also estimate the noise and interference observed by the Node B (step 3). The Node B may select a precoding matrix W based on the uplink MIMO channel matrix and in accordance with a selection criterion, e.g., the closest distance to a beamforming matrix $V_{UL}$ obtained from the uplink MIMO channel matrix (step 4). The Node B may determine S MCS values for S symbol streams based on the selected precoding matrix W and the estimated noise and interference and with consideration of the transmit power difference for the downlink and uplink (step 5). The Node B may send the S MCS values to the UE (step 6).

The Node B may also send a downlink reference signal or common pilot via the T antennas at the Node B (step 7). The UE may estimate the downlink MIMO channel response based on the downlink reference signal or common pilot and may obtain a downlink MIMO channel matrix $H_{DL}$ (step 8). The UE may obtain an uplink MIMO channel matrix $H_{UL}$ from the downlink MIMO channel matrix $H_{DL}$ by assuming channel reciprocity. The UE may then select the precoding matrix W based on the uplink MIMO channel matrix and in accordance with same selection criterion used by the Node B (step 9). The UE may process S symbol streams based on the S MCS values received from the Node B and may perform precoding for the S symbol streams based on the selected precoding matrix W (step 10). The UE may then send a MIMO transmission comprising the S symbol streams to the Node B.

The techniques described herein may provide certain advantages. The techniques exploit channel reciprocity to reduce feedback to just the CQI/MCS values. The Node B and the UE may both select the precoding matrix based on their estimated MIMO channel responses and using the same selection criterion. Hence, ambiguity in the selection of the precoding matrix and feedback of the precoding matrix may both be avoided. The CQI/MCS values may be determined based on the selected precoding matrix as well as the estimated noise and interference at the receiver. The CQI/MCS values may thus be able to account for any differences between the noise and interference at the Node B and the UE. Any differences between the downlink transmit power and the uplink transmit power may be accounted for in the determination of the CQI/MCS values at the receiver or may be adjusted at the transmitter. The downlink reference signal from the Node B and the sounding reference signal from the UE may be used to support MIMO transmissions on both the downlink and the uplink.

FIG. 4 shows a design of a process 400 for sending a MIMO transmission in a wireless communication system. Process 400 may be performed by a transmitter, which may be a Node B for MIMO transmission on the downlink or a UE for MIMO transmission on the uplink. The transmitter may send a first reference signal to a receiver (block 412). The transmitter may receive CQI or MCS information from the receiver (block 414) and may also receive a second reference signal from the receiver (block 416). The transmitter may select a precoding matrix based on the second reference signal and in accordance with a selection criterion (block 418). The receiver may also select the precoding matrix based on the first reference signal in accordance with the same selection criterion used by the transmitter. The receiver may determine the CQI or MCS information based on the precoding matrix and estimated noise and interference at the receiver.

In one design of block 418, the transmitter may obtain a MIMO channel matrix based on the second reference signal. The transmitter may obtain a beamforming matrix based on the MIMO channel matrix, e.g., using singular or eigenvalue decomposition. The transmitter may then select the precoding matrix from a codebook of precoding matrices based on the beamforming matrix and in accordance with the selection criterion, which may be the closest distance between the beamforming matrix and the precoding matrix. The precoding matrix may be determined by the transmitter and thus not sent by the receiver, which may reduce feedback overhead.

The transmitter may send a MIMO transmission to the receiver based on the CQI or MCS information and the precoding matrix (block 420). In one design, the transmitter may obtain S CQI values or S MCS values for S symbol streams from the CQI or MCS information, where S may be one or greater. The transmitter may adjust the S CQI or MCS values, e.g., to account for difference in the transmit power used by the receiver to determine the CQI or MCS information and the transmit power used by the transmitter for the MIMO transmission. The transmitter may encode and modulate the S symbol streams in accordance with the S CQI or MCS values. The transmitter may also perform precoding for S symbol streams based on S columns of the precoding matrix. In general, the precoding matrix may have one or more columns used for precoding. The precoding matrix may be referred to as a precoding vector if only one column is used for precoding.

FIG. 5 shows a design of an apparatus 500 for sending a MIMO transmission in a wireless communication system. Apparatus 500 includes a module 512 to send a first reference signal from a transmitter to a receiver, a module 514 to receive CQI or MCS information from the receiver, a module 516 to receive a second reference signal from the receiver, a module 518 to select a precoding matrix based on the second reference signal and in accordance with a selection criterion also used by the receiver to select the precoding matrix, and a module 520 to send a MIMO transmission to the receiver based on the CQI or MCS information and the precoding matrix.

FIG. 6 shows a design of a process 600 for receiving a MIMO transmission in a wireless communication system. Process 600 may be performed by a receiver, which may be a UE for MIMO transmission on the downlink or a Node B for MIMO transmission on the uplink. The receiver may receive a first reference signal from a transmitter (block 612). The receiver may select a precoding matrix based on the first reference signal and in accordance with a selection criterion also used by the transmitter to select the precoding matrix (block 614). In one design of block 614, the receiver may obtain a MIMO channel matrix based on the first reference signal. The receiver may obtain a beamforming matrix based on the MIMO channel matrix, e.g., using singular or eigenvalue decomposition. The receiver may then select the precoding matrix from a codebook of precoding matrices based on the beamforming matrix and in accordance with the selection criterion, which may be the closest distance between the beamforming matrix and the precoding matrix.

The receiver may estimate noise and interference at the receiver (block 616). The receiver may determine the number of symbol streams to transmit and CQI or MCS information for the symbol streams based on the precoding matrix, the estimated noise and interference, and possibly other information such as the difference between the downlink transmit power and the uplink transmit power (block 618). The receiver may send the CQI or MCS information to the transmitter (block 620) and may also send a second reference signal to the transmitter (block 622). The receiver may receive a MIMO transmission sent by the transmitter based on the CQI or MCS information and the precoding matrix (block 624). The precoding matrix may be selected by the transmitter based on the second reference signal and in accordance with the same selection criterion used by the receiver.

The receiver may derive a detection matrix based on the MIMO channel matrix and the precoding matrix (block 626).

The receiver may perform MIMO detection for the received MIMO transmission based on the detection matrix (block 628). The receiver may further demodulate and decode the S symbol streams in the received MIMO transmission in accordance with S CQI values or S MCS values from the CQI or MCS information (block 630).

In FIGS. 4 and 6, the MIMO transmission may be sent on the downlink. In this case, the transmitter may be part of a Node B, the receiver may be part of a UE, the first reference signal may comprise a downlink reference signal, and the second reference signal may comprise a sounding reference signal. The MIMO transmission may also be sent on the uplink. In this case, the transmitter may be part of a UE, the receiver may be part of a Node B, the first reference signal may comprise a sounding reference signal, and the second reference signal may comprise a downlink reference signal.

FIG. 7 shows a design of an apparatus 700 for receiving a MIMO transmission in a wireless communication system. Apparatus 700 includes a module 712 to receive a first reference signal from a transmitter at a receiver, a module 714 to select a precoding matrix based on the first reference signal and in accordance with a selection criterion also used by the transmitter to select the precoding matrix, a module 716 to estimate noise and interference at the receiver, a module 718 to determine CQI or MCS information based on the precoding matrix, the estimated noise and interference, and possibly other information, a module 720 to send the CQI or MCS information to the transmitter, a module 722 to send a second reference signal to the transmitter, a module 724 to receive a MIMO transmission sent by the transmitter based on the CQI or MCS information and the precoding matrix, a module 726 to derive a detection matrix based on a MIMO channel matrix and the precoding matrix, a module 728 to perform MIMO detection for the received MIMO transmission based on the detection matrix, and a module 730 to demodulate and decode the received MIMO transmission in accordance with the CQI or MCS information.

The modules in FIGS. 5 and 7 may comprise processors, electronics devices, hardware devices, electronics components, logical circuits, memories, etc., or any combination thereof.

Figure 8:
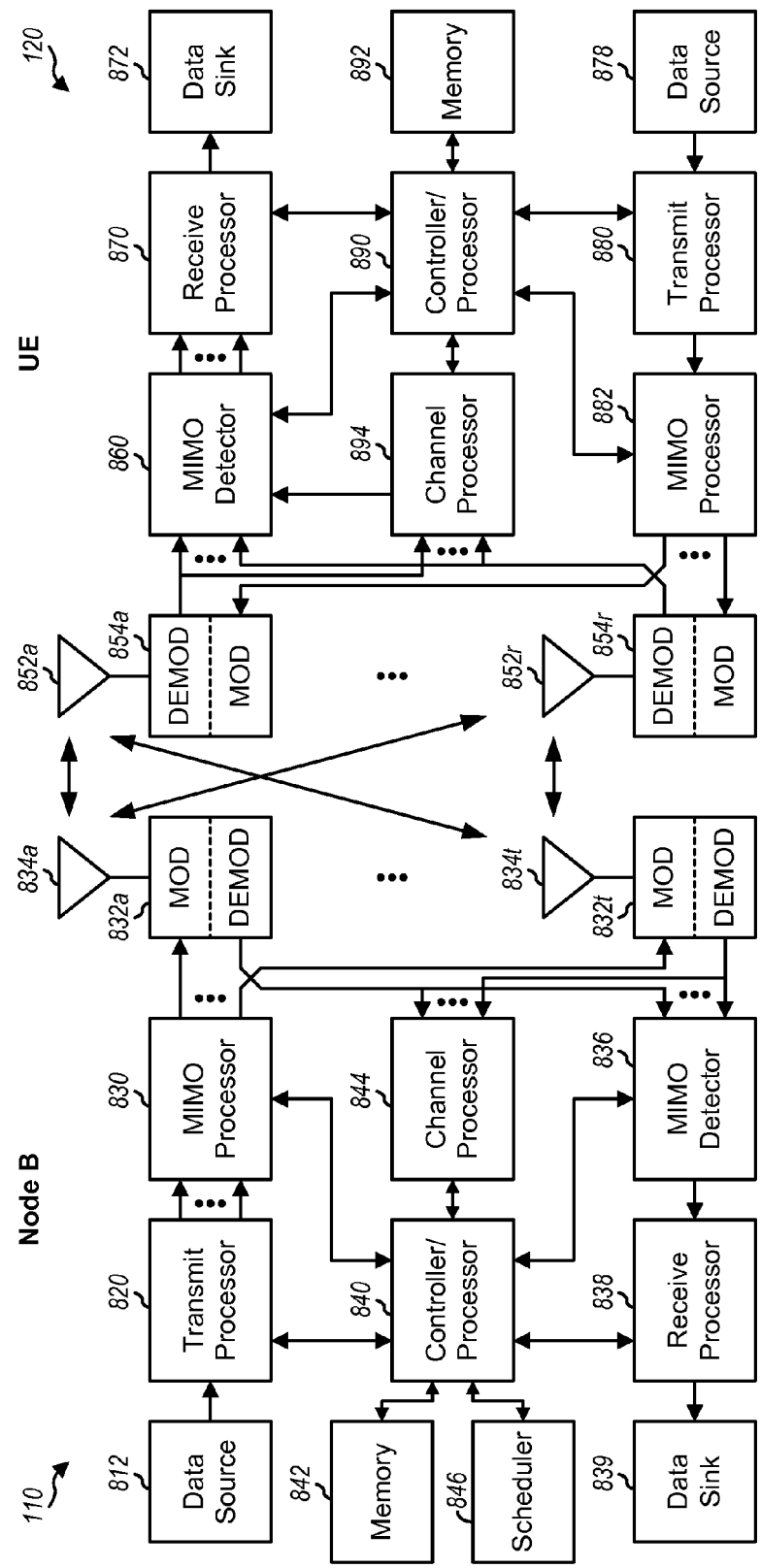
FIG. 8 shows a block diagram of a Node B and a UE.

FIG. 8 shows a block diagram of a design of a Node B 110 and a UE 120, which may be one of the Node Bs and one of the UEs in FIG. 1. Node B 110 is equipped with multiple ($N_T$) antennas 834a through 834t. UE 120 is equipped with multiple ($N_R$) antennas 852a through 852r.

At Node B 110, a transmit processor 820 may receive data for one or more UEs from a data source 812, process (e.g., encode and modulate) the data for each UE based on one or more modulation and coding schemes for that UE, and provide data symbols for all UEs. Transmit processor 820 may also generate control symbols for control information or signaling. Transmit processor 820 may further generate reference symbols for one or more reference signals, e.g., a downlink reference signal. A MIMO processor 830 may perform precoding on the data symbols for each UE based on a precoding matrix selected for that UE, as described above. MIMO processor 830 may also multiplex the precoded data symbols, the control symbols, and the reference symbols and may provide $N_T$ output symbol streams to $N_T$ modulators (MOD) 832a through 832t. Each modulator 832 may process its output symbol stream (e.g., for OFDM) to obtain an output sample stream. Each modulator 832 may further condition (e.g., convert to analog, filter, amplify, and upconvert) its output sample stream and generate a downlink signal. $N_T$ downlink signals from modulators 832a through 832t may be transmitted via antennas 834a through 834t, respectively.

At UE 120, $N_R$ antennas 852a through 852r may receive the $N_T$ downlink signals from Node B 110, and each antenna 852 may provide a received signal to an associated demodulator (DEMOD) 854. Each demodulator 854 may condition (e.g., filter, amplify, downconvert, and digitize) its received signal to obtain samples and may further process the samples (e.g., for OFDM) to obtain received symbols. Each demodulator 854 may provide received data symbols to a MIMO detector 860 and provide received reference symbols to a channel processor 894. Channel processor 894 may estimate the downlink MIMO channel from Node B 110 to UE 120 based on the received reference symbols and provide a MIMO channel estimate to MIMO detector 860. MIMO detector 860 may perform MIMO detection on the received data symbols based on the MIMO channel estimate and provide symbol estimates, which are estimates of the transmitted symbols. A receive processor 870 may process (e.g., demodulate and decode) the symbol estimates based on the one or more modulation and coding schemes for UE 120, provide decoded data to a data sink 872, and provide decoded control information to a controller/processor 890.

UE 120 may estimate the downlink channel quality and generate feedback information, which may comprise CQI or MCS information. The feedback information, data from a data source 878, and one or more reference signals (e.g., a sounding reference signal) may be processed (e.g., encoded and modulated) by a transmit processor 880, precoded by a MIMO processor 882, and further processed by modulators 854a through 854r to generate $N_R$ uplink signals, which may be transmitted via antennas 852a through 852r. At Node B 110, the $N_R$ uplink signals from UE 120 may be received by $N_T$ antennas 834a through 834t and processed by demodulators 832a through 832t. A channel processor 844 may estimate the uplink MIMO channel from UE 120 to Node B 110 and provide a MIMO channel estimate to MIMO detector 836. MIMO detector 836 may perform MIMO detection based on the MIMO channel estimate and provide symbol estimates. A receive processor 838 may process the symbol estimates, provide decoded data to a data sink 839, and provide decoded feedback information to a controller/processor 840. Controller/processor 840 may control data transmission to UE 120 based on the feedback information.

Controllers/processors 840 and 890 may direct the operation at Node B 110 and UE 120, respectively. Memories 842 and 892 may store data and program codes for Node B 110 and UE 120, respectively. A scheduler 846 may select UE 120 and/or other UEs for data transmission on the downlink and/or uplink based on the feedback information received from the UEs.

Processors 820, 830, 840 and/or 844 may perform all or part of process 400 in FIG. 4 for sending a MIMO transmission on the downlink. Processors 860, 870, 890 and/or 894 may perform all or part of process 600 in FIG. 6 for receiving the MIMO transmission on the downlink. Processors 880, 882, 890 and/or 894 may perform all or part of process 400 in FIG. 4 for sending a MIMO transmission on the uplink. Processors 836, 838, 840 and/or 844 may perform all or part of process 600 in FIG. 6 for receiving the MIMO transmission on the uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of receiving data in a wireless communication system, comprising:
   receiving a first reference signal from a transmitter at a receiver;
   selecting a first precoding matrix from a codebook of precoding matrices based on a beamforming matrix based on the first reference signal;
   determining channel quality indicator (CQI) or modulation and coding scheme (MCS) information based on the first precoding matrix;
   sending the CQI or MCS information to the transmitter;
   sending a second reference signal to the transmitter; and
   receiving, based on the CQI or MCS information and the first precoding matrix, a multiple-input multiple-output (MIMO) transmission sent by the transmitter based on the CQI or MCS information and a second precoding matrix, the second precoding matrix being selected by the transmitter based on the second reference signal.

2. The method of claim 1, wherein the selecting the first precoding matrix comprises selecting the first precoding matrix in accordance with a selection criterion also used by the transmitter to select the second precoding matrix.

3. The method of claim 1, wherein the selecting the first precoding matrix comprises:
   obtaining a MIMO channel matrix based on the first reference signal, and
   obtaining the beamforming matrix based on the MIMO channel matrix.

4. The method of claim 3, wherein the selecting the first precoding matrix from the codebook comprises selecting the first precoding matrix from the codebook based on the beamforming matrix and in accordance with a selection criterion of closest distance between the beamforming matrix and the precoding matrix.

5. The method of claim 1, wherein the determining the CQI or MCS information comprises:
   estimating noise and interference at the receiver, and
   determining the number of symbol streams to send and the CQI or MCS information for the symbol streams based on the first precoding matrix and the estimated noise and interference.

6. The method of claim 5, wherein the determining the CQI or MCS information further comprises determining the number of symbol streams to send and the CQI or MCS information for the symbol streams based further on a difference between transmit power for downlink and transmit power for uplink.

7. The method of claim 1, further comprising:
obtaining a MIMO channel matrix based on the first reference signal;
deriving a detection matrix based on the MIMO channel matrix and the first precoding matrix; and
performing MIMO detection for the received MIMO transmission based on the detection matrix.

8. The method of claim 1, further comprising:
demodulating and decoding S symbol streams sent in the received MIMO transmission in accordance with S CQI values or S MCS values from the CQI or MCS information, where S is one or greater.

9. The method of claim 1, wherein the MIMO transmission is received on downlink, wherein the transmitter is part of a Node B and the receiver is part of a user equipment (UE), and wherein the first reference signal comprises a downlink reference signal and the second reference signal comprises a sounding reference signal.

10. The method of claim 1, wherein the MIMO transmission is received on uplink, wherein the transmitter is part of a user equipment (UE) and the receiver is part of a Node B, and wherein the first reference signal comprises a sounding reference signal and the second reference signal comprises a downlink reference signal.

11. An apparatus for wireless communication, comprising:
at least one processor configured to receive a first reference signal from a transmitter at a receiver, to select a first precoding matrix from a codebook of preceding matrices based on a beamforming matrix based on the first reference signal, to determine channel quality indicator (CQI) or modulation and coding scheme (MCS) information based on the first precoding matrix, to send the CQI or MCS information to the transmitter, to send a second reference signal to the transmitter, and to receive, based on the CQI or MCS information and the first precoding matrix, a multiple-input multiple-output (MIMO) transmission sent by the transmitter based on the CQI or MCS information and a second precoding matrix, the second precoding matrix being selected by the transmitter based on the second reference signal; and
a memory coupled to the at least one processor.

12. The apparatus of claim 11, wherein the at least one processor is configured to select the first precoding matrix in accordance with a selection criterion also used by the transmitter to select the second precoding matrix.

13. The apparatus of claim 11, wherein the at least one processor is configured to obtain a MIMO channel matrix based on the first reference signal, and to obtain the beamforming matrix based on the MIMO channel matrix.

14. The apparatus of claim 11, wherein the at least one processor is configured to estimate noise and interference at the receiver, and to determine the number of symbol streams to send and the CQI or MCS information for the symbol streams based on the first precoding matrix and the estimated noise and interference.

15. An apparatus for wireless communication, comprising:
means for receiving a first reference signal from a transmitter at a receiver;
means for selecting a first precoding matrix from a codebook of precoding matrices based on the beamforming matrix based on the first reference signal;
means for determining channel quality indicator (CQI) or modulation and coding scheme (MCS) information based on the first precoding matrix;
means for sending the CQI or MCS information to the transmitter;
means for sending a second reference signal to the transmitter; and
means for receiving, based on the CQI or MCS information and the first precoding matrix, a multiple-input multiple-output (MIMO) transmission sent by the transmitter based on the CQI or MCS information and a second precoding matrix, the second precoding matrix being selected by the transmitter based on the second reference signal.

16. The apparatus of claim 15, wherein the means for selecting the first precoding matrix comprises means for selecting the first precoding matrix in accordance with a selection criterion also used by the transmitter to select the second precoding matrix.

17. The apparatus of claim 15, wherein the means for selecting the first precoding matrix comprises:
means for obtaining a MIMO channel matrix based on the first reference signal, and
means for obtaining the beamforming matrix based on the MIMO channel matrix.

18. The apparatus of claim 15, wherein the means for determining the CQI or MCS information comprises:
means for estimating noise and interference at the receiver, and
means for determining the number of symbol streams to send and the CQI or MCS information for the symbol streams based on the first precoding matrix and the estimated noise and interference.

19. A computer program product, comprising:
a non-transitory computer-readable medium comprising:
code for causing at least one computer to receive a first reference signal from a transmitter at a receiver,
code for causing at least one computer to select a first precoding matrix from a codebook of precoding matrices based on the beamforming matrix based on the first reference signal,
code for causing the at least one computer to determine channel quality indicator (CQI) or modulation and coding scheme (MCS) information based on the first precoding matrix,
code for causing the at least one computer to send the CQI or MCS information to the transmitter,
code for causing the at least one computer to send a second reference signal to the transmitter, and
code for causing the at least one computer to receive, based on the CQI or MCS information and the first precoding matrix, a multiple-input multiple-output (MIMO) transmission sent by the transmitter based on the CQI or MCS information and a second precoding matrix, the second precoding matrix being selected by the transmitter based on the second reference signal.

* * * * *